United States Patent
Watanuki et al.

(10) Patent No.: US 10,436,141 B2
(45) Date of Patent: Oct. 8, 2019

(54) CONTROL APPARATUS FOR INTERNAL COMBUSTION ENGINE

(71) Applicant: Mitsubishi Electric Corporation, Tokyo (JP)

(72) Inventors: Takuo Watanuki, Tokyo (JP); Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 153 days.

(21) Appl. No.: 15/635,348

(22) Filed: Jun. 28, 2017

(65) Prior Publication Data

US 2018/0094599 A1 Apr. 5, 2018

(30) Foreign Application Priority Data

Oct. 5, 2016 (JP) ................................. 2016-196886

(51) Int. Cl.
*F02D 41/24* (2006.01)
*F02D 9/08* (2006.01)
(Continued)

(52) U.S. Cl.
CPC ........... *F02D 41/2438* (2013.01); *F02D 9/02* (2013.01); *F02D 9/08* (2013.01); *F02D 41/0002* (2013.01);
(Continued)

(58) Field of Classification Search
CPC ............. F02D 2250/16; F02D 41/2445; F02D 41/2464; F02D 2009/0201
See application file for complete search history.

(56) References Cited

U.S. PATENT DOCUMENTS 6,363,316 B1 * 3/2002 Soliman ................ F02D 11/105
123/399
6,460,409 B1 * 10/2002 Soliman .............. F02D 41/1401
73/114.32
(Continued)

FOREIGN PATENT DOCUMENTS

JP 4237214 B2 3/2009
JP 2012-219683 A 11/2012
(Continued)

OTHER PUBLICATIONS

Communication dated Jul. 4, 2017 from the Japanese Patent Office in counterpart Application No. 2016-196886.

*Primary Examiner* — Sizo B Vilakazi
*Assistant Examiner* — Kevin R Steckbauer
(74) *Attorney, Agent, or Firm* — Sughrue Mion, PLLC; Richard C. Turner

(57) ABSTRACT

By calculating a throttle opening learning value based on an actual effective opening area calculated based on the actual flow rate of intake air and an actual throttle opening with respect to variations caused by type differences of throttle valves and by calculating a throttle opening learning completion range indicating the region for which throttle opening learning completion has been determined based on the state of deviation between an effective opening area corrected by throttle opening learning and the actual effective opening area, control that applies the throttle opening learning value or fail-safe of an air flow sensor is performed in a contiguous throttle opening learning completion range.

8 Claims, 11 Drawing Sheets

(51) Int. Cl.
  *F02D 41/00*  (2006.01)
  *F02D 41/18*  (2006.01)
  *F02D 41/22*  (2006.01)
  *F02M 35/10*  (2006.01)
  *F02D 9/02*   (2006.01)

(52) U.S. Cl.
  CPC ........... *F02D 41/18* (2013.01); *F02D 41/222* (2013.01); *F02D 41/248* (2013.01); *F02D 41/2445* (2013.01); *F02D 41/2464* (2013.01); *F02M 35/1038* (2013.01); *F02D 41/2477* (2013.01); *F02D 2041/002* (2013.01); *F02D 2041/0017* (2013.01); *F02D 2200/0402* (2013.01); *F02D 2200/0404* (2013.01); *F02D 2200/0406* (2013.01); *F02D 2250/16* (2013.01); *Y02T 10/42* (2013.01)

(56) References Cited

U.S. PATENT DOCUMENTS

| | | | |
|---|---|---|---|
| 6,591,667 B1* | 7/2003 | Kotwicki | F02D 11/107 73/114.33 |
| 6,640,622 B2* | 11/2003 | Soliman | F02D 41/1401 73/114.31 |
| 6,718,822 B2* | 4/2004 | Soliman | F02D 41/1401 73/114.32 |
| 7,266,442 B2* | 9/2007 | Ting | F02D 41/0002 701/114 |
| 7,305,967 B1* | 12/2007 | Hagari | F02D 9/02 123/403 |
| 7,398,149 B2* | 7/2008 | Ueno | F02M 26/47 123/568.21 |
| 7,400,967 B2* | 7/2008 | Ueno | F02D 41/0002 123/295 |
| 7,717,098 B2* | 5/2010 | Nakano | F02D 31/005 123/480 |
| 7,831,371 B2* | 11/2010 | Nishimura | F02D 11/10 123/403 |
| 7,953,529 B2* | 5/2011 | Takamiya | F01L 1/34 701/103 |
| 8,224,592 B2* | 7/2012 | De Cristofaro | F02D 41/18 702/45 |
| 8,645,046 B2* | 2/2014 | Kawakatsu | F02D 41/0085 123/673 |
| 8,676,472 B2* | 3/2014 | Tsukamoto | F02D 41/18 701/103 |
| 8,843,296 B2* | 9/2014 | Pursifull | F02D 41/18 123/320 |
| 9,228,519 B2* | 1/2016 | Hagari | F02D 41/182 |
| 9,261,031 B2* | 2/2016 | Watanuki | F02D 23/02 |
| 9,297,319 B2* | 3/2016 | Wang | F02D 41/0002 |
| 9,341,135 B2* | 5/2016 | Watanuki | F02D 43/00 |
| 9,587,571 B2* | 3/2017 | Hagari | F02D 41/0007 |
| 9,605,608 B2* | 3/2017 | Yokono | F02D 11/105 |
| 9,611,798 B2* | 4/2017 | Hagari | F02D 11/10 |
| 9,650,973 B1* | 5/2017 | Hellstrom | F02D 9/1055 |
| 9,835,094 B2* | 12/2017 | Lahti | F02D 41/1446 |
| 9,856,802 B2* | 1/2018 | Yokono | F02D 41/1448 |
| 9,863,347 B2* | 1/2018 | Yokono | F02D 41/0002 |
| 9,897,024 B2* | 2/2018 | Yokono | F02D 41/0002 |
| 9,964,027 B2* | 5/2018 | Hagari | F02B 37/18 |
| 10,006,383 B2* | 6/2018 | Yokono | F02D 41/0007 |
| 10,026,241 B1* | 7/2018 | Sankavaram | G07C 5/0808 |
| 10,125,703 B2* | 11/2018 | Watanuki | F02D 41/0072 |
| 2002/0179050 A1* | 12/2002 | Soliman | F02D 41/1401 123/399 |
| 2003/0005756 A1* | 1/2003 | Soliman | F02D 41/1401 73/114.34 |
| 2007/0061062 A1* | 3/2007 | Ting | F02D 41/0002 701/103 |
| 2007/0068159 A1* | 3/2007 | Ueno | F02B 37/12 60/605.2 |
| 2007/0174003 A1* | 7/2007 | Ueno | F02D 41/0002 701/104 |
| 2008/0097681 A1* | 4/2008 | Nakano | F02D 31/002 701/103 |
| 2008/0314132 A1* | 12/2008 | Nakano | G01M 15/09 73/114.32 |
| 2009/0292452 A1* | 11/2009 | Nishimura | F02D 11/10 701/106 |
| 2011/0276254 A1* | 11/2011 | Tsukamoto | F02D 41/18 701/103 |
| 2012/0173118 A1* | 7/2012 | Wang | F02D 41/0002 701/102 |
| 2012/0255532 A1* | 10/2012 | Kawakatsu | F02D 41/0085 123/673 |
| 2013/0282256 A1* | 10/2013 | Watanuki | F02D 23/02 701/102 |
| 2014/0116376 A1* | 5/2014 | Hagari | F02D 41/182 123/319 |
| 2015/0013640 A1* | 1/2015 | Watanuki | F02D 43/00 123/350 |
| 2015/0226137 A1* | 8/2015 | Hagari | F02D 11/10 123/344 |
| 2015/0240731 A1* | 8/2015 | Yokono | F02D 11/105 60/611 |
| 2015/0377156 A1* | 12/2015 | Hagari | F02D 41/0007 60/602 |
| 2016/0069285 A1* | 3/2016 | Watanuki | F02D 41/0072 701/108 |
| 2016/0084176 A1* | 3/2016 | Yokono | F02D 41/0007 |
| 2016/0237939 A1* | 8/2016 | Hagari | F02D 11/10 |
| 2016/0377004 A1* | 12/2016 | Yokono | F02D 41/1448 701/103 |
| 2017/0051662 A1* | 2/2017 | Hagari | F02B 37/18 |
| 2017/0082047 A1* | 3/2017 | Yokono | F02D 41/0002 |
| 2017/0101949 A1* | 4/2017 | Yokono | F02D 41/0002 |
| 2017/0122228 A1* | 5/2017 | Hellstrom | F02D 9/1055 |
| 2017/0122240 A1* | 5/2017 | Burkhardt | F02D 41/182 |
| 2017/0138279 A1* | 5/2017 | Xiao | F02D 41/182 |
| 2018/0094599 A1* | 4/2018 | Watanuki | F02D 9/02 |
| 2018/0100456 A1* | 4/2018 | Yokono | F02B 39/10 |

FOREIGN PATENT DOCUMENTS

| | | | |
|---|---|---|---|
| JP | 2012219683 A * | 11/2012 | ......... F02D 41/0085 |
| JP | 5328967 B1 | 10/2013 | |
| JP | 2016-20642 A | 2/2016 | |
| JP | 2016020642 A * | 2/2016 | ............ F02D 41/14 |

* cited by examiner

CONTROL APPARATUS FOR INTERNAL COMBUSTION ENGINE

BACKGROUND OF THE INVENTION

Field of the Invention

The present invention relates to a control apparatus for internal combustion engines that controls a throttle opening to be applied to calculate control parameters for internal combustion engines.

Description of the Related Art

In recent years, an engine control method referred to as "torque-based control" is widely used. The torque-based control uses an engine output shaft torque as a driving force request value from a driver or a vehicle and controls the generation torque of the engine using this torque as an indicator. The torque-based control determines the target torque of the engine based on the amount of operation of the accelerator pedal by the driver, controls the opening of the throttle valve so that the target flow rate of intake air for enabling the generation of the target torque is sucked to the engine, adjusts the output of the engine to the target torque by controlling the amount of fuel injection and the ignition timing according to the actual flow rate of intake air, and achieves the travel performance requested by the driver.

In the control apparatus for an engine that controls the throttle opening by driving the actuator provided in tandem for the throttle valve of the engine to achieve the target flow rate of intake air corresponding to the target torque of an engine, there is proposed a section that obtains the target opening area of the throttle valve by applying the target flow rate of intake air, the ratio of pressures before and after the throttle valve, the opening area of the throttle valve, and the like to the flow rate expression of the basic throttle type flow meter, and controls the actuator connected to the throttle valve to obtain the throttle opening that achieves the target opening area of the throttle valve.

In addition, for example, Japanese Patent No. 4237214 (PTL 1) proposes the technique that focuses on the fact that the correlation between the effective opening area and the throttle opening prepared in advance depends on variations in the throttle valve, various kinds of sensors, and the like, and learning-corrects the correlation between the effective opening area and the throttle opening to match the actual flow rate of intake air with the target flow rate of intake air, so that the actual flow rate of intake air accurately matches the target flow rate of intake air.

In addition, for example, Japanese Patent No. 5328967 (PTL 2) proposes the technique that uses the learning of the correlation between the throttle opening and the effective opening area and calculates the actual cylinder flow rate of intake air based on the learned correlation from the time of transient change until the temperature of the interior of the exhaust pipe from the exhaust valve to the catalyst converges.

[PTL 1] Japanese Patent No. 4237214
[PTL 2] Japanese Patent No. 5328967

However, since throttle opening learning improves the control accuracy by subdividing the learning region for each driving zone in the technique proposed in PTL 1 or PTL 2, learning may not be completed only by general travel in the region that is difficult to drive, such as, for example, the full-open region. Accordingly, when a learning incompletion region by such a driving pattern is left, the control accuracy is not improved even if the throttle opening learning value is considered in throttle control across a learning incompletion region.

SUMMARY OF THE INVENTION

The invention addresses the above problem with an object of providing a control apparatus for internal combustion engines capable of making control that applies a throttle opening learning value or performing the fail-safe of an intake air flow rate detection section in a contiguous throttle opening learning completion range.

A control apparatus for internal combustion engines according to the invention includes a throttle valve that is provided in an intake passage of an internal combustion engine, an operating state detection device including a throttle opening detection device that detects an actual opening of the throttle valve, an intake air flow rate detection device that detects an actual flow rate of intake air supplied to the internal combustion engine, an intake manifold pressure detection device that detects a pressure between the throttle valve and the internal combustion engine as an intake manifold pressure, and an intake air temperature detection device that detects a temperature of intake air between the throttle valve and the atmosphere, the operating state detection device detecting an operating state of the internal combustion engine, and an electronic control device that receives output information from the operating state detection device, in which the electronic control device includes a throttle control unit that variably controls a flow rate of intake air supplied to the internal combustion engine by changing an effective opening area of the intake passage by controlling an opening of the throttle valve, an effective opening area calculation unit that calculates an actual effective opening area corresponding to an actual throttle opening detected by the throttle opening detection device by applying the actual flow rate of intake air, the intake manifold pressure, and the intake air temperature to a flow rate formula for a throttle type flow meter, a throttle opening learning value calculation unit that learns a correlation between the effective opening area and the throttle opening based on a correlation map between the effective opening area and the throttle opening prepared in advance, the actual effective opening area, and the actual throttle opening and calculates a throttle opening learning value, a throttle opening learning completion determination unit that determines whether a deviation is equal to or less than a predetermined value, the deviation being obtained based on the correlation map between the effective opening area and the throttle opening after learning-correcting the throttle opening, the actual effective opening area, and the actual throttle opening, a throttle opening learning completion range determination unit that determines whether the actual throttle opening falls within the range of a contiguous throttle opening region for which completion of learning of the throttle opening has been determined, and a throttle opening learning completion range update unit that updates a throttle opening learning completion range when the throttle opening learning completion determination unit has determined the completion of learning of the actual throttle opening and the throttle opening learning completion range determination unit has determined that the actual throttle opening falls outside the range, and in which the throttle opening learning value present in the throttle opening learning completion range updated by the throttle opening learning completion range update unit is used to calculate a target throttle opening and control the throttle valve.

The control apparatus for internal combustion engines according to the invention makes the correlation between the effective opening area and the actual throttle opening close to the normal state by calculating the effective opening area using the flow rate of intake air, performs throttle opening learning control for absorbing variations caused by type differences of the throttle valve at the same time, calculates the throttle opening learning completion range indicating the region having undergone throttle opening learning based on the state of deviation between the effective opening area corrected by the throttle opening learning and the actual effective opening area, and performs control that applies the throttle opening learning value or the fail-safe of the intake air flow rate detection section at high accuracy in the contiguous throttle opening learning completion range by determining whether to use the throttle opening learning value, thereby obtaining excellent effects.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

A control apparatus for internal combustion engines according to a preferred embodiment of the invention will be described below with reference to the drawings.

Embodiment 1

Figure 1:
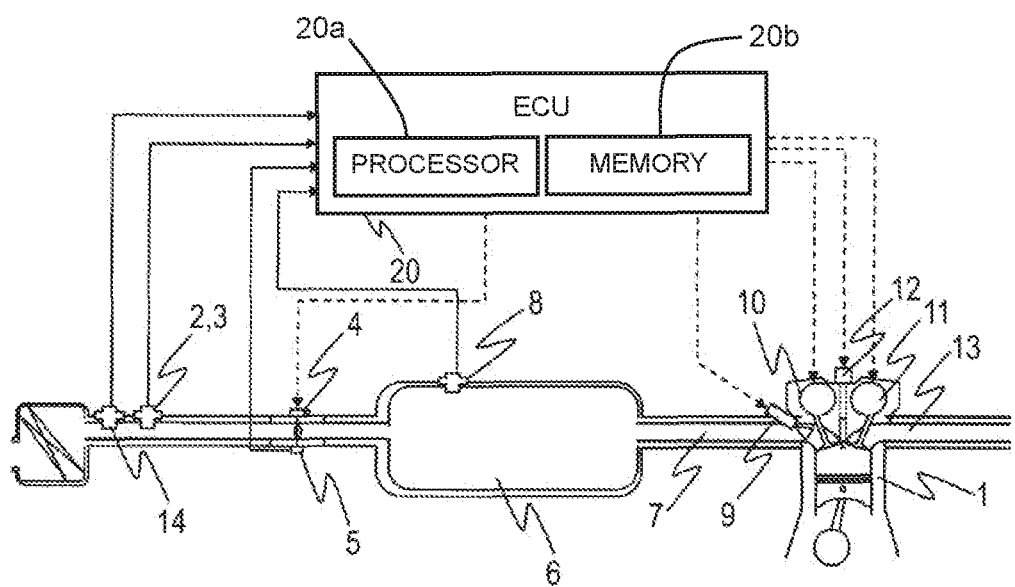
FIG. 1 is a structural diagram schematically illustrating a control apparatus for internal combustion engines according to embodiment 1 of the invention.
Figure 2:
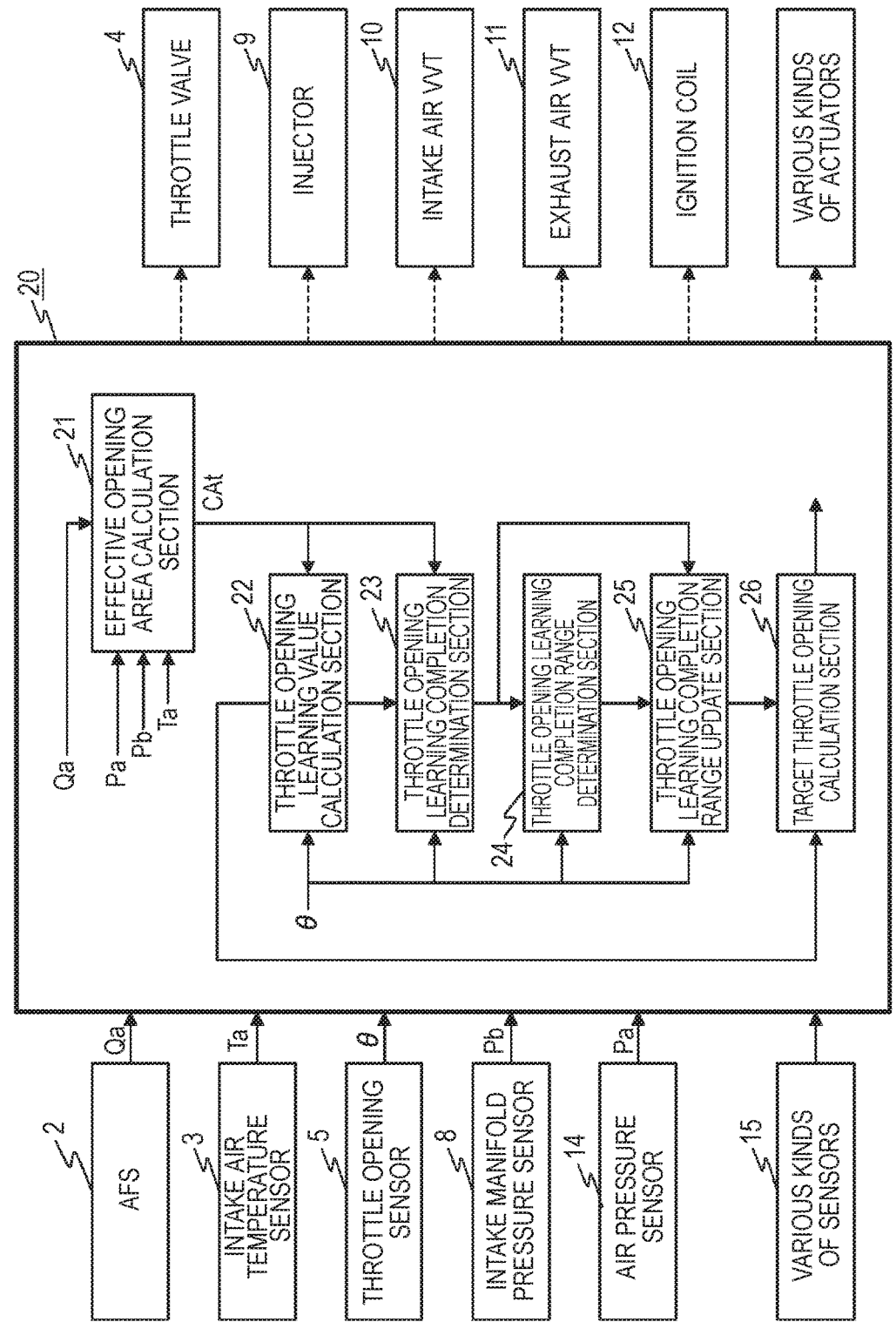
FIG. 2 is a block diagram illustrating the schematic structure of an engine control part according to embodiment 1 of the invention.

FIG. 1 is a structural diagram schematically illustrating a control apparatus for the internal combustion engine according to embodiment 1 of the invention and FIG. 2 is a block diagram illustrating the schematic structure of an engine control part in the control apparatus for the internal combustion engine illustrated in FIG. 1.

In FIG. 1, an air flow sensor (referred to below as the AFS) 2 as an intake air flow rate detection section to detect the flow rate of intake air is provided upstream of an intake system of an engine 1 and an intake air temperature sensor 3 as an intake air temperature detection section is provided as a built-in component or a separate component of the AFS 2. A throttle valve 4 that can be electrically controlled to adjust the flow rate of intake air is provided between the downstream side of the AFS 2 and the engine 1. In addition, a throttle opening sensor 5 is provided as a throttle opening detection section to detect the opening of the throttle valve 4.

In addition, an intake manifold pressure sensor 8 is provided as an intake manifold pressure detection section that detects the pressure (referred to below as the intake manifold pressure) of the space (referred to below as the intake manifold) including the interiors of a surge tank 6 and an intake manifold 7 provided downstream of the throttle valve 4. The method (so-called S/D (speed density) method) for estimating the flow rate of intake air based on the intake manifold pressure may be used in place of the AFS 2 and the intake air temperature sensor 3 may be provided in the intake manifold.

An injector 9 for injecting fuel is provided in the vicinity of the intake valve including the intake manifold 7 and the inside of the cylinder, the intake valve and the exhaust valve are provided with an intake air VVT (Variable Valve Timing) 10 and an exhaust air VVT 11, respectively, for changing valve timing, and the cylinder head is provided with an ignition coil 12 for driving an ignition plug for generating a spark in the cylinder. An exhaust manifold 13 is provided with an air fuel ratio sensor and catalyst, which are not illustrated, and the intake manifold 7 is provided with an air pressure sensor 14. It should be noted that either the intake air VVT 10 or the exhaust air VVT 11 may be provided or none of them may be provided.

An electronic control unit (referred to below as the ECU) 20 including a microcomputer and an interface circuit receives, as information indicating the operational state of the engine 1, information from the AFS 2, the intake air temperature sensor 3, the throttle opening sensor 5, the intake manifold pressure sensor 8, the air fuel ratio sensor, the air pressure sensor 14 that are described above, and various kinds of other sensors (including an accelerator opening sensor and a crank angle sensor, which are not illustrated). The ECU 20 includes a processor 20a and a memory 20b.

The processor 20a of the ECU 20 calculates the target torque based on the input various types of data, calculates the target flow rate of intake air for achieving the calculated target torque, calculates the target effective opening area so as to achieve the target flow rate of intake air using the method described later, and obtains the target throttle opening. Then, the processor 20a of the ECU 20 calculates an indication value for controlling the opening of the throttle valve 4 so as to achieve the target throttle opening. That is, the processor 20a of the ECU 20 has the function as a throttle opening control section. At the same time, the processor 20a of the ECU 20 calculates indication values for various kinds of actuators including the injector 9 and the ignition coil 12.

FIG. 2 is a block diagram illustrating the schematic structure of the engine control part.

In FIG. 2, the ECU 20 receives signals from the AFS 2, the intake air temperature sensor 3, the throttle opening sensor 5, the intake manifold pressure sensor 8, the air fuel ratio sensor, the air pressure sensor 14, and various kinds of sensors 15 that constitute an operating state detection section and outputs indication values for the throttle valve 4, the injector 9, the intake air VVT 10, the exhaust air VVT 11, the ignition coil 12, and various kinds of actuators (not illustrated) constituting a section that controls the engine 1. It should be noted that a section that estimates the air pressure may be used or the air pressure sensor built into the ECU 20 may be used in place of the air pressure sensor 14 for detecting the air pressure.

Although the processor 20a of the ECU 20 performs all processing concerning engine control, a throttle control part and a throttle opening learning completion determination part that perform the processing concerning the control of the throttle valve 4 will be schematically described here.

An actual effective opening area CAt of the throttle valve 4 is obtained by an effective opening area calculation section 21 based on an actual flow rate of intake air Qa (estimated from an intake manifold pressure Pb in the case of the S/D method) detected by the AFS 2, an intake air temperature Ta (used in place of the air temperature when the intake air temperature sensor is provided in the intake manifold) detected by the intake air temperature sensor 3, the intake manifold pressure Pb detected by the intake manifold pressure sensor 8, and an air pressure Pa detected by the air pressure sensor 14.

Next, a throttle opening learning value calculation section 22 calculates a throttle opening learning value TPLRN based on the actual effective opening area CAt calculated by the effective opening area calculation section 21, an actual throttle opening θ detected by the throttle opening sensor 5, and a correlation map between the effective opening area and the throttle opening prepared in advance.

Subsequently, a throttle opening learning completion determination section 23 calculates the deviation based on the actual effective opening area CAt, the actual throttle opening θ, and the correlation map between the effective opening area and the throttle opening after learning-correcting the throttle opening and determines whether the deviation falls within the predetermined value range. In addition, a throttle opening learning completion range determination section 24 determines whether the actual throttle opening θ falls within the range of a contiguous throttle opening region for which throttle opening learning has been determined to be completed.

A throttle opening learning completion range update section 25 updates an air pressure estimation value throttle opening learning completion range when the throttle opening learning completion determination section 23 determines that the actual throttle opening θ has been learned and the throttle opening learning completion range determination section 24 determines that the actual throttle opening θ falls outside the range. A target throttle opening calculation section 26 calculates the target throttle opening based on the updated throttle opening learning completion range, the throttle opening learning value, and other types of information and controls the throttle valve 4 based on the calculated target throttle opening.

The operation of the throttle control part and the throttle opening learning completion determination part has been schematically described above.

Next, the processing performed by the throttle opening learning completion determination section 23 will be described in detail.

As illustrated in FIGS. 3 to 7, the processing by the throttle opening learning completion determination section 23 within the processor 20a of the ECU 20 is performed in the calculation processing (for example, the main processing at intervals of 10 ms or interrupt processing at intervals of BTDC75degCA) at predetermined timings.

Figure 3:
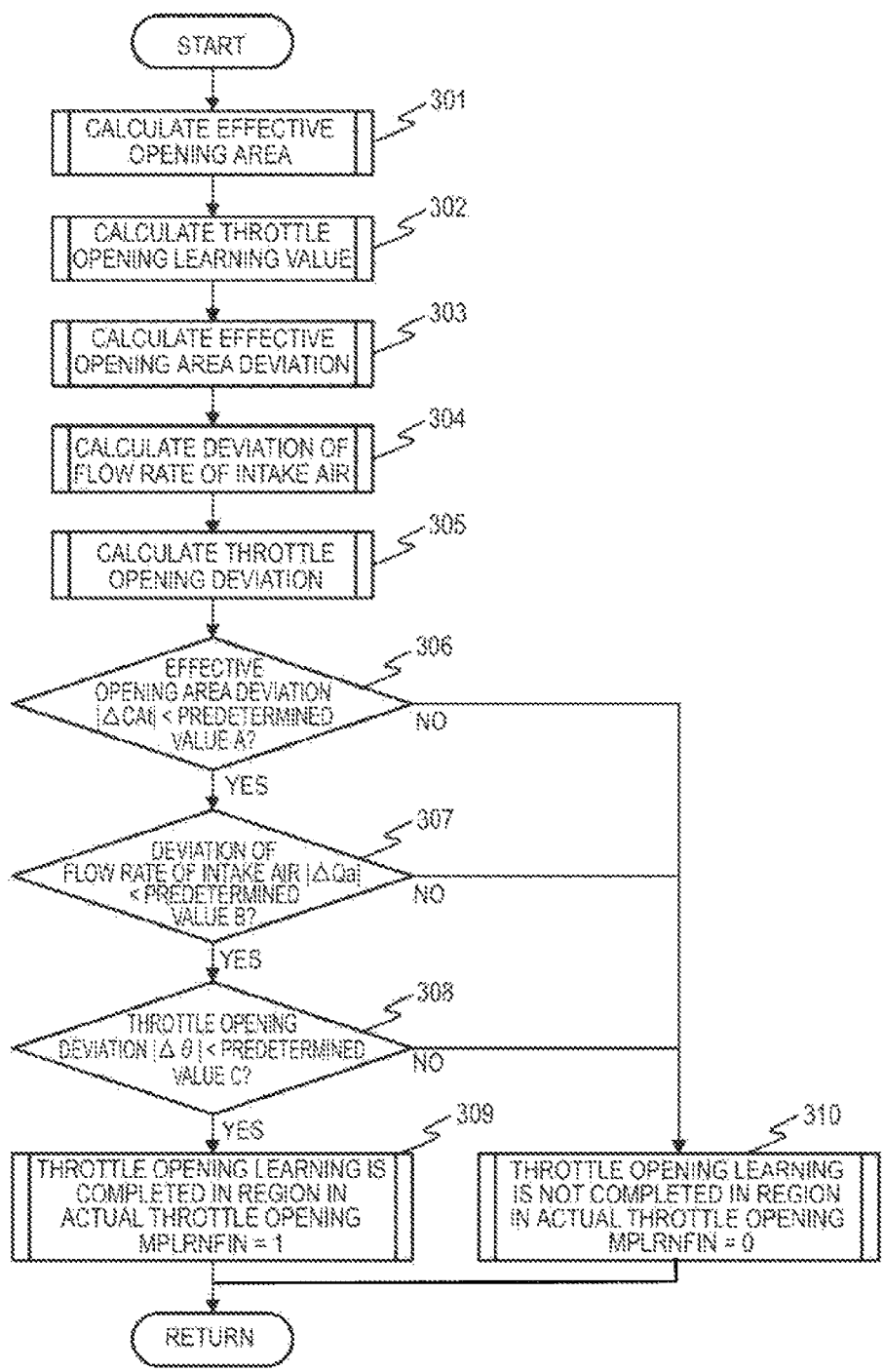
FIG. 3 is a flowchart illustrating throttle opening learning completion determination processing according to embodiment 1 of the invention.

In step 301 in the flowchart illustrated in FIG. 3, the effective opening area calculation section 21 calculates the actual effective opening area CAt of the throttle valve 4. Although this calculation method is basically the same as the method disclosed in PTL 1, basic expressions of fluid dynamics used here will be described. The volumetric flow rate expression (in the case of compressible fluid) of a so-called throttle type flow meter will be given as expression (1) below.

[Mathematical 1]

$$Qa = \alpha_a \cdot CA_t \cdot \sqrt{\frac{2}{\kappa-1}\left[\left(\frac{P_b}{P_a}\right)^{\frac{2}{\kappa}} - \left(\frac{P_b}{P_a}\right)^{\frac{\kappa+1}{\kappa}}\right]} \quad (1)$$

It is assumed that the flow rate of intake air is Qa [L/s], the acoustic velocity of air is αa [m/s], the effective opening area of the throttle valve 4 is CAt [cm$^2$], the intake manifold pressure is Pb [kPa], the air pressure is Pa [kPa], and the specific heat ratio is κ. Here, when a dimensionless flow rate σ is defined as expression (2) below,

[Mathematical 2]

$$\sigma = \sqrt{\frac{2}{\kappa-1}\left[\left(\frac{P_b}{P_a}\right)^{\frac{2}{\kappa}} - \left(\frac{P_b}{P_a}\right)^{\frac{\kappa+1}{\kappa}}\right]} \quad (2)$$

Expression (1) can be simplified as expression (3) below.

[Mathematical 3]

$$Qa = \alpha_a \cdot CA_t \cdot \sigma \quad (3)$$

It should be noted that the acoustic velocity of air αa [m/s] is represented as expression (4) below when the gas constant is assumed to be R [kJ/(kg·K)] and the air temperature is assumed to be Ta [K].

[Mathematical 4]

$$\alpha_a = \sqrt{\kappa R T_a} \qquad (4)$$

Here, when the actual flow rate of intake air Qa, the acoustic velocity of air αa, and the dimensionless flow rate σ are given, the actual effective opening area CAt of the throttle valve 4 can be calculated by expression (5) below, which is obtained by modifying expression (3).

[Mathematical 5]

$$CA_t = \frac{Qa}{\alpha_a \cdot \sigma} \qquad (5)$$

When the actual flow rate of intake air Qa, the acoustic velocity of air αa, and the dimensionless flow rate σ are given as shown above, the actual effective opening area CAt of the throttle valve 4 is obtained.

Next, in step 302, the throttle opening learning value is calculated. The method for calculating the throttle opening learning value will be described later.

Subsequently, in step 303, the deviation of the effective opening area is calculated. The deviation of the effective opening area is calculated by following the flowchart illustrated in FIG. 4.

Figure 4:
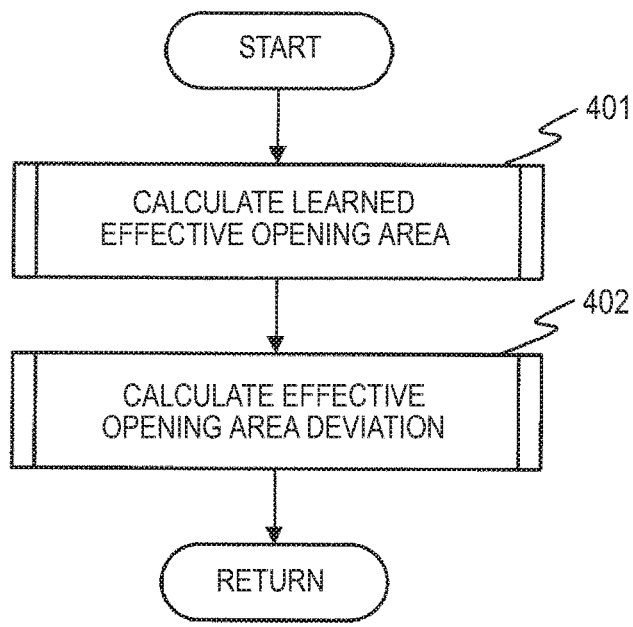
FIG. 4 is a flowchart illustrating calculation processing of an effective opening area deviation according to embodiment 1 of the invention.
Figure 5:
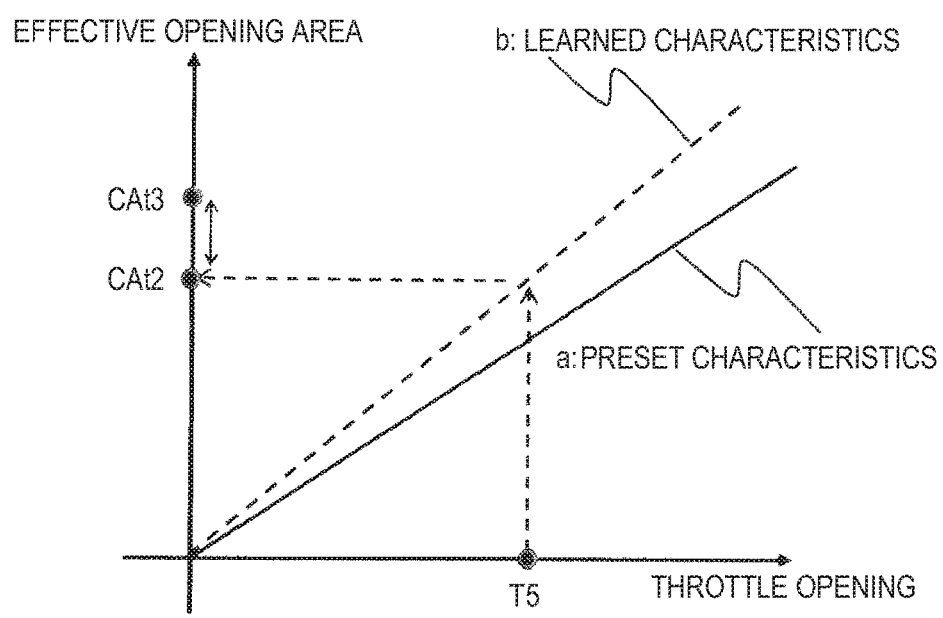
FIG. 5 is an explanatory diagram illustrating the correlation between a throttle opening and an effective opening area according to embodiment 1 of the invention.
Figure 6:
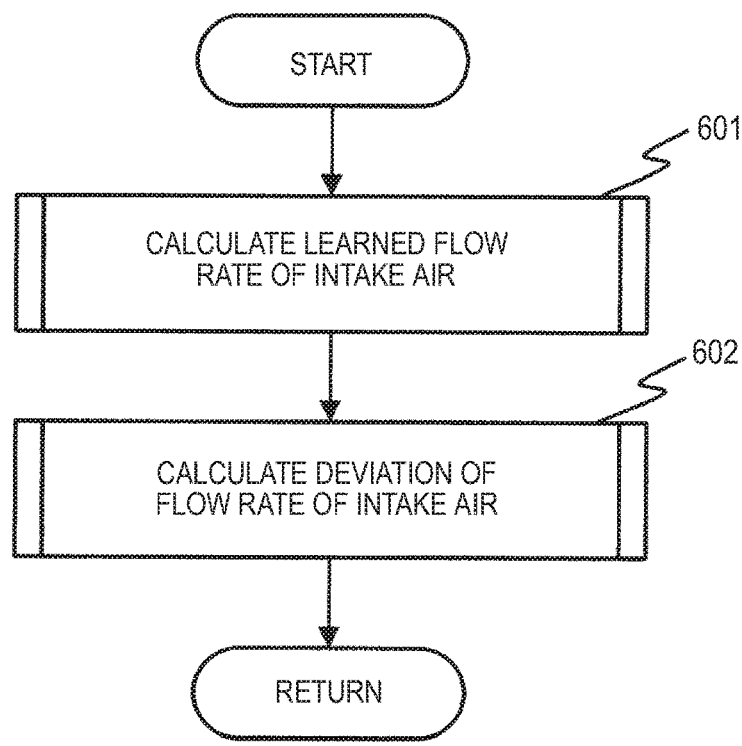
FIG. 6 is a flowchart illustrating calculation processing of the deviation of a flow rate of an intake air according to embodiment 1 of the invention.
Figure 7:
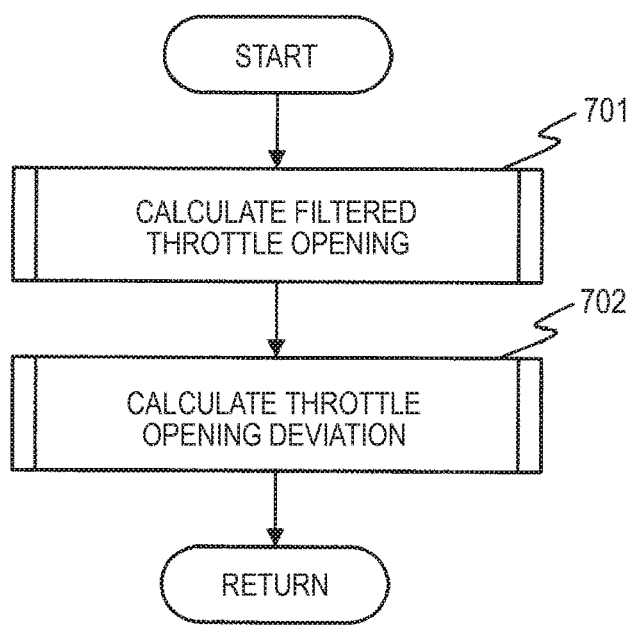
FIG. 7 is a flowchart illustrating calculation processing of a throttle opening deviation according to embodiment 1 of the invention.

The flowchart in FIG. 4 will be described. First, in step 401, the effective opening area learning value at this time is calculated based on the actual throttle opening θ obtained from the throttle opening sensor 5, the correlation between the effective opening area and the throttle opening prepared in advance, and the effective opening area learning value at the previous processing timing and then a learned effective opening area CAt' with respect to the actual throttle opening θ is calculated. When, for example, the vertical axis represents the effective opening area and the horizontal axis represents the throttle opening as illustrated in FIG. 5, if a solid line a represents the correlation between the effective opening area and the throttle opening prepared in advance, the value corrected by the throttle opening learning value is represented by a dashed line b. If the actual throttle opening θ is assumed to be T5, a learned effective opening area is obtained as CAt2. It should be noted that the actual effective opening area calculated in step 301 in FIG. 3 is assumed to be CAt3. Next, in step 402, an effective opening area deviation ΔCAt is calculated based on the actual effective opening area CAt3 and the learned effective opening area CAt2.

Returning to FIG. 3, in step 304, the deviation of the flow rate of intake air is calculated. The deviation of the flow rate of intake air is calculated by following the flowchart illustrated in FIG. 6. The flowchart in FIG. 6 will be described. First, in step 601, a learned flow rate of intake air Qa2 is calculated using expression (5) based on the learned effective opening area CAt2, the acoustic velocity of air αa, and the dimensionless flow rate σ. Next, in step 602, a deviation of the flow rate of intake air ΔQa is calculated based on the actual flow rate of intake air Qa and the learned actual flow rate of intake air Qa2.

Returning to FIG. 3 again, in step 305, the deviation of the throttle opening is calculated. The deviation of the throttle opening is calculated by following the flowchart illustrated in FIG. 7. The flowchart in FIG. 7 will be described. First, in step 701, a filtered throttle opening θ2, which is obtained by smoothing the actual throttle opening θ using a primary filter, is calculated. Next, in step 702, a throttle opening deviation Δθ is calculated based on the actual throttle opening θ and the filtered throttle opening θ2.

Returning to FIG. 3, in step 306, a determination is made as to whether the absolute value of the effective opening area deviation ΔCAt calculated in step 303 is smaller than a predetermined value A. When the determination result is YES, the processing proceeds to step 307. When the determination result is NO, the processing proceeds to step 310.

In step 307, a determination is made as to whether the absolute value of the deviation of the flow rate of intake air ΔQa calculated in step 304 is smaller than a predetermined value B. When the determination result is YES, the processing proceeds to step 308. When the determination result is NO, the processing proceeds to step 310.

In step 308, a determination is made as to whether the absolute value of the throttle opening deviation Δθ calculated in step 305 is smaller than a predetermined value C. When the determination result is YES, the processing proceeds to step 308. When the determination result is NO, the processing proceeds to step 310.

Next, in step 309, only when all conditions in step 306, step 307, and step 308 are met, it is determined that throttle opening learning is completed (MPLRNFIN=1) in the region in the actual throttle opening θ. In step 310, when one of the conditions of step 306, step 307, and step 308 is not met, it is determined that throttle opening learning is not completed (MPLRNFIN=0) in the region in the actual throttle opening θ. Now, the processing for throttle opening learning completion determination ends.

The throttle opening learning completion range is updated by the above processing.

Subsequently, the calculation of a throttle opening learning value performed by the throttle opening learning value calculation section 22 in step 302 will be described in detail. The throttle opening learning value is calculated in the same method as in PTL 1.

The method for achieving the throttle opening learning value calculation section 22 using expressions (1) to (5) above will be described.

Figure 8:
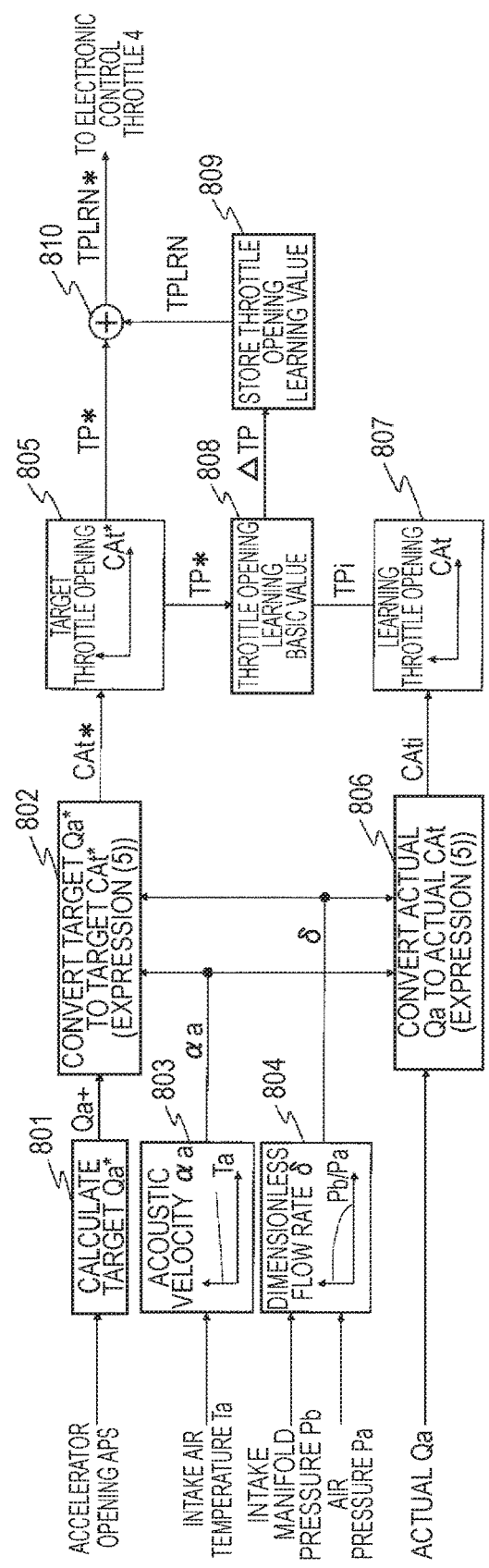
FIG. 8 is a control block diagram schematically illustrating a calculation processing part for a throttle opening learning value according to embodiment 1 of the invention.
Figure 9:
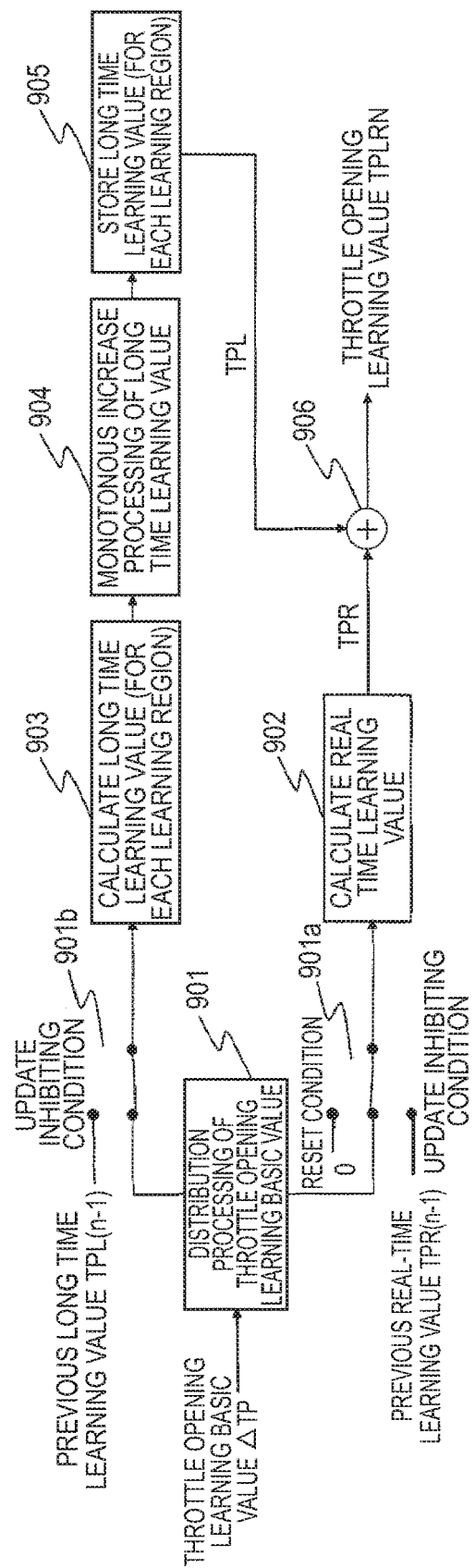
FIG. 9 is a control block diagram schematically illustrating a storage processing part for a long time learning value according to embodiment 1 of the invention

FIGS. 8 and 9 are control block diagrams illustrating details on the throttle opening learning value calculation section 22. First, the throttle control and the throttle opening learning of the throttle opening learning value calculation section 22 will be schematically described with reference to the control block diagram in FIG. 8.

In block 801, engine output indicators such as a target torque is calculated based on various types of input data such as an accelerator opening. Then, the target cylinder flow rate of intake air necessary to achieve the calculated engine output indicators is calculated and, based on the target cylinder flow rate of intake air, the target flow rate of intake air (referred to below as the target Qa*) passing through the throttle valve 4 is calculated.

In the subsequent block 802, a target effective opening area (referred to below as the target CAt*) is calculated as the target to be achieved based on the target Qa*, the acoustic velocity of air αa, and the dimensionless flow rate σ using expression (5). Since the target CAt* is calculated based on the flow rate expression for a throttle type flow meter as described above, even when environmental conditions are changed or the operational state of the engine 1 such as exhaust gas recirculation (EGR) introduction for introducing the exhaust gas into an intake pipe is changed, the target CAt* for favorably achieving the target Qa* can be calculated.

By the way, when the acoustic velocity of air αa necessary for calculation in block 802 is calculated in the processor 20a of the ECU 20 using expression (4), calculation loads become large. Accordingly, as in block 803, the theoretical value of the acoustic velocity of air is stored in advance as a map having the intake air temperature Ta as an axis and the acoustic velocity of air αa is calculated in block 803 using the intake air temperature Ta before calculation in bock 802.

In addition, it is not practical to calculate the dimensionless flow rate σ required in calculation in the in block 802 using expression (2) in the processor 20a of the ECU 20 because calculation loads become large. Accordingly, as in block 804, to suppress calculation loads in the processor 20a of the ECU 20, the theoretical value of the dimensionless flow rate is calculated in advance and stored as a map having an axis of the pressure ratio Pb/Pa of the intake manifold pressure Pb to the air pressure Pa, the pressure ratio Pb/Pa of the intake manifold pressure Pb to the air pressure Pa is calculated before calculation in bock 802, and the dimensionless flow rate σ is calculated in block 804 using the calculated pressure ratio (Pb/Pa).

By the way, it is known that, when the pressure ratio Pb/Pa is equal to or less than a predetermined value E (approximately 0.528 in the case of air), the flow rate of air flowing through the throttle valve 4 is saturated (that is, choked). It is known that, when choking occurs, the dimensionless flow rate σ calculated in expression (2) becomes a constant value. Accordingly, when the pressure ratio of the intake manifold pressure to the air pressure is equal to or less than the predetermined value E, occurrence of choking can be addressed by setting the value in the map in block 804 to a constant value (approximately 0.5787 in the case of air) corresponding to the predetermined value E.

In addition, when the pressure ratio Pb/Pa becomes large to some extent, the dimensionless flow rate σ may be greatly affected by oscillations of the intake manifold pressure due to intake air pulsation. When the pressure ratio Pb/Pa is equal to or more than a predetermined value Pr (for example, approximately 0.95), if the value in the map in block 804 is treated as a constant value (for example, approximately 0.26) corresponding to the predetermined value Pr, the effect of intake air pulsation can be reduced and the controllability of the throttle valve can be obtained. It should be noted that, when the intake manifold pressure peak value is larger than the air pressure, since it is considered that air flows backward in the throttle valve 4 due to pressure oscillations in the intake manifold, the value of the map in block 804 may be treated as a constant value (for example, approximately 0.26) corresponding to the predetermined value Pr in this case.

As described above, a target throttle opening TP* is calculated in block 805 using the target CAt* calculated in block 802. At this time, the correlation between the actual effective opening area CAt calculated by expression (5) using the actual flow rate of intake air Qa and a throttle opening TP is detected in advance, the correlation between the effective opening area and the throttle opening is stored as a correlation map in which the effective opening area CAt corresponds to the throttle opening TP on a one-to-one basis, so that the target throttle opening TP* can be calculated based on the target effective opening area CAt* using this map.

The following describes the method for calculating the throttle opening learning value TPLRN so as to reduce the error between the target Qa and the actual Qa caused by variations in the throttle body, various kinds of sensors, and the like and various estimation errors when the throttle valve 4 is controlled by the target throttle opening TP* calculated as described above.

To calculate the throttle opening learning value TPLRN, in block 806, an actual effective opening area CAti used for learning is calculated based on the actual flow rate of intake air Qa, the acoustic velocity of air αa, and the dimensionless flow rate σ. In the subsequent block 807, a learning throttle opening is calculated based on the actual effective opening area CAti using the same map as in block 805. In block 808, a deviation ΔTP (=TP*−TPi) between the target throttle opening TP* and the learning throttle opening TPi is calculated as a throttle opening learning basic value, the throttle opening learning value TPLRN is calculated by, for example, integrating the deviation ΔTP, and the result is stored. The processing for storing the throttle opening learning value TPLRN in block 809 will be described in detail later.

The target throttle opening TP* and the throttle opening learning value TPLRN calculated as described above are added in block 810 to calculate a learning-corrected target throttle opening TPLRN* for driving the throttle valve 4 finally.

As described above, the throttle opening learning value calculation section 22 calculates the throttle opening learning value TPLRN based on the throttle opening learning basic value ΔTP (deviation between the target throttle opening TP* and the learning throttle opening TPi) and controls the throttle opening TP using the learning-corrected target throttle opening TPLRN* obtained by correcting the target throttle opening TP* using the throttle opening learning value TPLRN.

The learning function for throttle opening control will be specifically described below with reference to FIG. 10.

Figure 10:
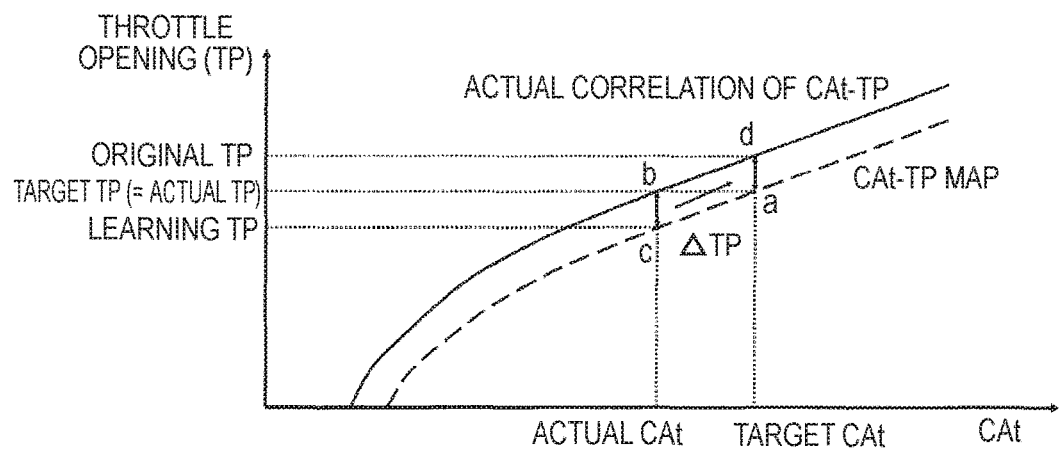
FIG. 10 is an explanatory diagram schematically illustrating a calculation method for a throttle opening learning basic value according to embodiment 1 of the invention.

FIG. 10 schematically illustrates the calculation method for the throttle opening learning basic value. When it is assumed that the throttle opening TP corresponds to the effective opening area CAt on a one-to-one basis, if an error is present between the target flow rate of intake air Qa* and the actual flow rate of intake air Qa, an error is also present between the target effective opening area CAt* calculated based on the target flow rate of intake air Qa* and the actual effective opening area CAti calculated based on the actual flow rate of intake air Qa.

The following considers the case in which, for example, as illustrated in FIG. 10, there is an error between the correlation map (referred to below as the CAt-TP map) between the effective opening area and the throttle opening used for control (the map is used in blocks 805 and 807, see the dashed line) and the correlation (referred to below as the CAt-TP correlation, see the solid line) between the actual throttle opening TP and the actual effective opening area CAt estimated and calculated so as to include variations in the throttle valve body of the engine 1 which is currently to be controlled and variations in various kinds of sensors for detecting the intake manifold pressure Pb, the intake air temperature Ta, and the like (variations in AFS have been corrected by the corrected flow rate of intake air).

At this time, the correlation between the target effective opening area CAt* and the target throttle opening TP* is represented by a point a in the CAt-TP map in FIG. 10. However, if an error is present between the CAt-TP map (dashed line) and the actual CAt-TP correlation (solid line) as illustrated in FIG. 10, the actual effective opening area CAti of a point b in the actual CAt-TP correlation (solid line) corresponding to the target throttle opening TP* is different from the target effective opening area CAt* and the actual flow rate of intake air Qa obtained when the throttle opening TP is adjusted to the target throttle opening TP* does not match the target flow rate of the intake air Qa*.

To calculate the learning value for correcting this error, the actual effective opening area CAti is calculated based on the actual flow rate of intake air Qa detected when the throttle opening TP is adjusted to the target throttle opening TP*. The correlation between the actual effective opening area CAti and the target throttle opening TP* is represented by the point b in the curve representing the actual CAt-TP correlation (solid line) in FIG. 10.

Since the throttle opening TP needs to be adjusted to a point d in the curve representing the actual CAt-TP correlation (solid line) to achieve the target effective opening area CAt* (target flow rate of intake air Qa*), the difference between the point a and the point d needs to be calculated as a learning value. At this time, on the assumption that the CAt-TP map (dashed line) is locally parallel to the actual CAt-TP correlation (solid line) as illustrated in FIG. 10, the learning throttle opening TPi is calculated using the CAt-TP map (dashed line) based on the actual effective opening area CAti calculated based on the actual flow rate of intake air Qa detected when the throttle opening TP is adjusted to the target throttle opening TP*.

The correlation between the learning opening TPi calculated here and the actual effective opening area CAti is represented by a point c in the CAt-TP map (dashed line) in FIG. 10. Accordingly, the throttle opening learning basic value $\Delta TP$ (=TP*−TPi) represented as the difference between the point b and the point c can be assumed to be substantially the same as the learning basic value between the point a and the point d. The throttle opening learning value TPLRN is obtained by multiplying this throttle opening learning basic value $\Delta TP$ by the gain and integrating the result. By controlling the throttle opening using the learning-corrected target throttle opening TPLRN* obtained by adding the throttle opening learning value TPLRN to the target throttle opening TP*, the error between the target flow rate of intake air Qa* and the actual flow rate of intake air Qa is reduced.

By doing this, when the throttle opening TP for obtaining the target flow rate of intake air Qa* is calculated, the correlation between the effective opening area CAt and the throttle opening TP can be learning-corrected to preferably achieve the target flow rate of intake air Qa* against variations in the throttle valve body, various kinds of sensors, and the like and errors in various kinds of estimation calculation. When the error between the CAt-TP map (dashed line) and the actual CAt-TP correlation (solid line) has a substantially constant (substantially parallel) correlation at this time, even if the throttle opening learning value TPLRN is used solely for feedback control, preferable control can be made over all driving regions.

Figure 11:
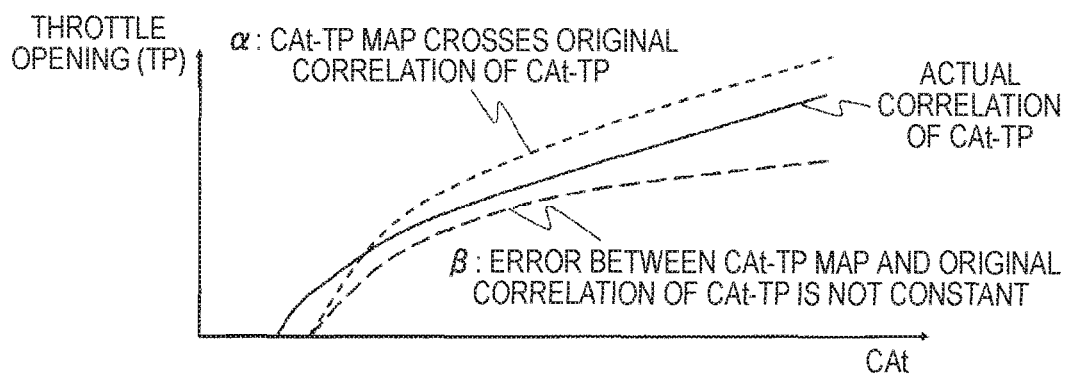
FIG. 11 is an explanatory diagram schematically illustrating the correlation allowed between an actual effective opening area and a throttle opening according to embodiment 1 of the invention.

By the way, when the CAt-TP map (dashed line α) crosses the actual CAt-TP correlation (solid line) as illustrated in, for example, FIG. 11 or when the error of the CAt-TP map (dashed line β) is not constant (parallel), if the throttle opening learning value TPLRN is used solely, a problem such as a follow-up delay or overshoot may occur at the time of transient operation.

To address such a problem, it is preferable to store the throttle opening learning basic value $\Delta TP$ distributed to a real-time learning value TPR used as feedback control and a long time learning value TPL stored for each learning region corresponding to the CAt axis (horizontal axes in FIG. 10 and FIG. 11) of the Cat-TP map and to calculate the throttle opening learning value TPLRN based on these values. This can make the sum of the value in the CAt-TP map and the long time learning value TPL close to the actual CAt-TP correlation. In addition, if the real-time learning value TPR is used together, an instant error can be absorbed by feedback control.

The calculation method and the storage method for the throttle opening learning value will be described in detail with reference to the explanatory diagrams in FIG. 12 and FIG. 13 together with the functional block diagram in FIG. 9.

In FIG. 9, the distribution processing of the throttle opening learning basic value $\Delta TP$ is performed in block 901 and the division into the real-time learning value TPR and the long time learning value TPL is performed at a predetermined ratio. When a predetermined reset condition is met, a switching section 901a inputs 0 in block 902 for calculating the real-time learning value. When a predetermined update inhibiting condition is met, the switching section 901a inputs a previous real-time learning value TPR(n−1). When the reset condition or the update inhibiting condition of the real-time learning value TPR is not met, the switching section 901a inputs the distributed throttle opening learning basic value $\Delta TP$. Accordingly, in block 902, when the reset condition or the update inhibiting condition described later of the real-time learning value TPR is not met, the final real-time learning value TPR is calculated based on the distributed throttle opening learning basic value $\Delta TP$.

When the predetermined update inhibiting condition is met, a switching section 901b inputs a previous long time learning value TPL(n−1) in block 903. When the update inhibiting condition of the long time learning value TPL is not met, the switching section 901b inputs the distributed throttle opening learning basic value $\Delta TP$. Accordingly, in block 903, when the update inhibiting condition of the long time learning value TPL is not met, the switching section 901b calculates the final long time learning value TPL for each learning region corresponding to the CAt axis of the CAt-TP map based on the distributed throttle opening learning basic value $\Delta TP$.

As a specific example of the update inhibiting condition in the switching sections 901a and 901b, when the pressure ratio Pb/Pa of the intake manifold pressure Pb to the air pressure Pa is equal to or more than a predetermined value F or when the peak value of the intake manifold pressure is more than the air pressure, since an error is generated in calculation by expression (2), the update of the real-time learning value TPR and the long time learning value TPL can be prevented.

In addition, as a specific example of the reset condition in the switching section 901a, the real-time learning value TPR may be reset in the period in which the elapsed time after a time change rate dQa*/dt of the target flow rate of intake air Qa* reaches a predetermined value G or more is equal to or less than a predetermined value H. Although this condition corresponds to the case in which transient driving is detected, this condition can also be used as the update inhibiting condition of the long time learning value TPL to suppress erroneous learning.

In block 904, the long time learning value TPL is restricted so that the CAt-TP map and the actual CAt-TP correlation corrected by adding the long time learning value TPL are monotonously increased. This processing also suppresses erroneous learning and keeps the correlation between the throttle opening and the flow rate of intake air so as to monotonously increase. In block 905, the long time learning value TPL via a monotonous increase processing section is stored for each learning region. In block 906, the real-time learning value TPR is added to the long time learning value TPL to calculate the throttle opening learning value TPLRN.

It should be noted that the long time learning value is stored in the backup memory in block 905. That is, when the engine 1 is stopped or the ECU 20 is powered off, the real-time learning value TPR is reset, but the long time learning value TPL is held in the backup memory.

Next, referring to FIGS. 12 and 13, the calculation processing for each learning region of the long time learning value TPL in FIG. 9 will be described specifically.

Figure 12:
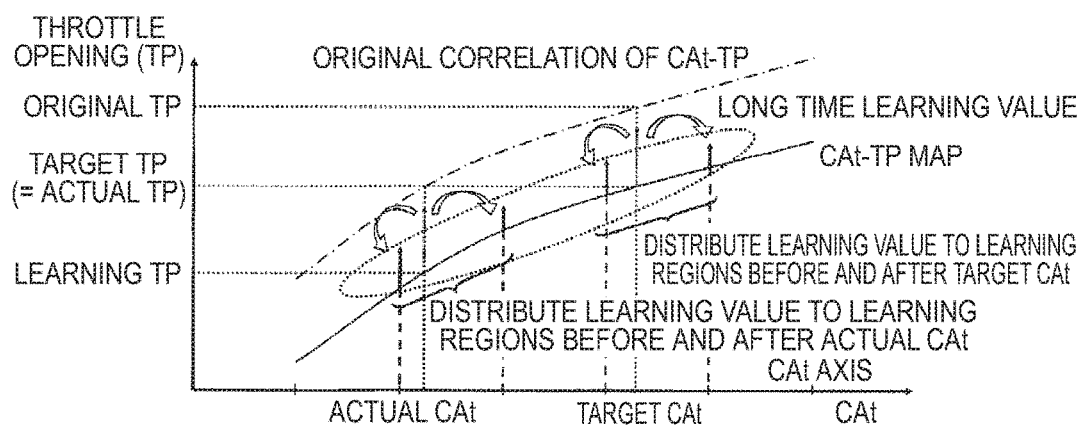
FIG. 12 is an explanatory diagram schematically illustrating storage processing for the long time learning value according to embodiment 1 of the invention.
Figure 13:
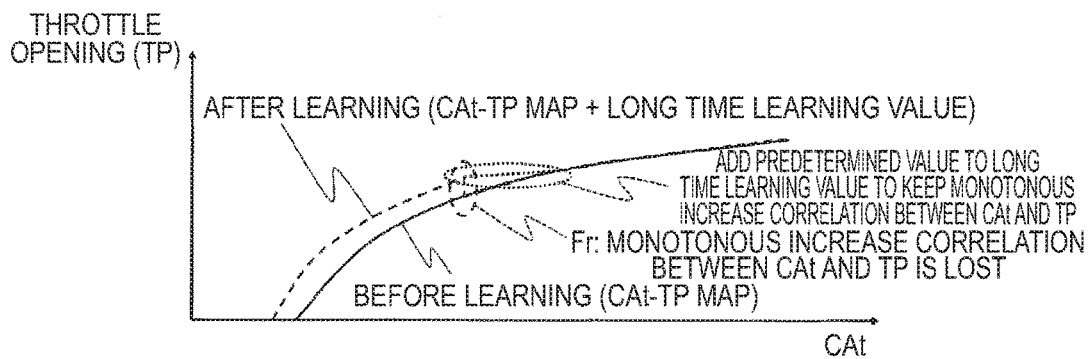
FIG. 13 is an explanatory diagram schematically illustrating monotonous increase processing according to embodiment 1 of the invention.

FIGS. 12 and 13 are explanatory diagrams schematically illustrating the storage processing and the monotonous increase processing of the long time learning value TPL, respectively. In FIG. 10, although the throttle opening learning basic value ΔTP is the difference between the point b and the point c, this value is also applied as the learning value between the point a and the point d. The following considers the case in which the throttle opening learning basic value ΔTP is distributed to and stored in each of learning regions corresponding to the CAt axis of the CAt-TP map, for example, on a one-to-one basis. At this time, as illustrated in FIG. 10, the throttle opening learning basic value LTP can be stored, as the long time learning value TPL, in at least one of the learning regions corresponding to the CAt axes before and after the target effective opening area CAt* and the learning regions corresponding to the CAt axes before and after the actual effective opening area CAti.

It should be noted that the long time learning value TPL stored in the learning region corresponding to each of the CAt axes can be calculated by adding the predetermined value that is based on the throttle opening learning basic value ΔTP to the previous long time learning value TPL(n−1) or by calculating the value corresponding to the ratio from the predetermined value to the CAt axes before and after the target effective opening area CAt* and the actual effective opening area CAti and adding the value. In addition, if both the target effective opening area CAt* and the actual effective opening area CAti store the long time learning value TPL, the convergence time of the long time learning value TPL can be reduced.

When the long time learning value TPL is calculated as described above, since the case in which the update inhibiting condition described later is not met is the only learnable condition, learning is performed actually only in the regular use area of steady state operation. In addition, since the correlation between the throttle opening TP and the flow rate of intake air Qa generally monotonously increases, the correlation between the effective opening area CAt and the throttle opening TP needs to monotonously increase.

However, when learning is performed locally, as illustrated by the dash line and a dashed line frame Fr in FIG. 13, the sum (dashed line) of the value of the CAt-TP map (solid line) and the long time learning value TPL may not increase monotonously. In this case, since the learning-corrected target opening TPLRN* is reduced even though, for example, the target flow rate of intake air Qa* increases, the output of the engine 1 may be reduced or erroneous learning of the throttle opening learning value TPLRN is caused.

In block 904 in FIG. 9, the long time learning value TPL is restricted for each learning region of the long time learning value TPL so that the sum (dashed line) of the value of the CAt-TP map (solid line) and the long time learning value TPL monotonous increases as illustrated by the dash line and the dashed line frame Fr in FIG. 13. This can prevent the erroneous learning of the throttle opening learning value TPLRN and a malfunction.

In this way, the throttle opening learning value calculation section 22 can be achieved and the correlation between the throttle opening and the effective opening area can be learned.

Figure 14:
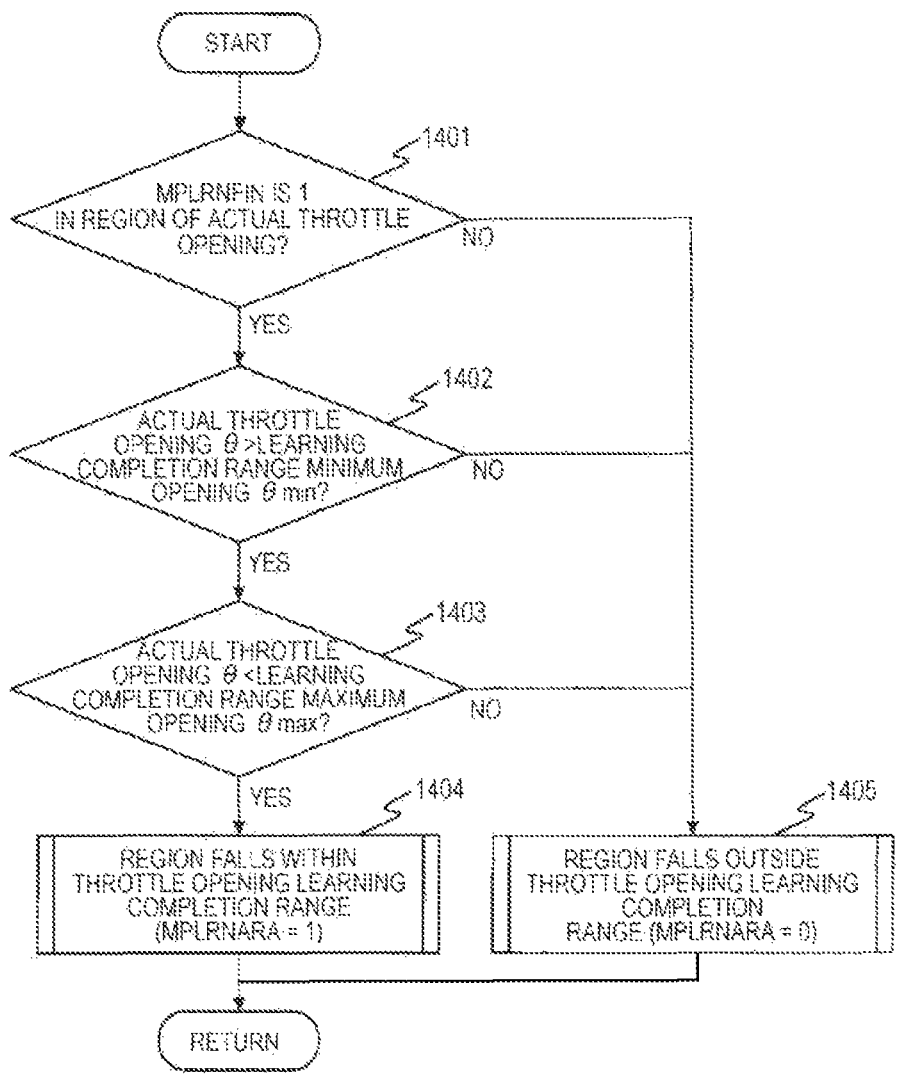
FIG. 14 is a flowchart illustrating throttle opening learning completion range determination processing according to embodiment 1 of the invention.

Next, the processing by the throttle opening learning completion range determination section 24 performed in the processor 20a of the ECU 20 will be described in detail with reference to the flowchart in FIG. 14 executed in calculation processing (for example, the main processing at intervals of 10 ms or interrupt processing at intervals of BTDC75degCA) at predetermined intervals.

In step 1401, a determination is made as to whether the throttle opening learning completion (MPLRNFIN=1) calculated by the throttle opening learning completion determination section 23 is met in the region of the actual throttle opening θ. When the determination result is YES, the processing proceeds to step 1402. When the determination result is NO, the processing proceeds to step 1405.

In step 1402, a determination is made as to whether the actual throttle opening θ is larger than a learning completion range minimum opening θmin. When the determination result is YES, the processing proceeds to step 1403. When the determination result is NO, the processing proceeds to step 1405.

In step 1403, a determination is made as to whether the actual throttle opening θ is smaller than a learning completion range maximum opening θmax. When the determination result is YES, the processing proceeds to step 1404. When the determination result is NO, the processing proceeds to step 1405.

Next, in step 1404, only when all conditions in step 1402 and step 1403 are met (that is, only when the actual throttle opening θ is larger than the learning completion range minimum opening θmin and smaller than the learning completion range maximum opening θmax), it is determined that the actual throttle opening θ falls within the throttle opening learning completion range (MPLRNARA=1). In step 1405, when one of the conditions in step 1402 and step 1403 is not met, it is determined that the actual throttle opening θ falls outside the throttle opening learning completion range (MPLRNARA=0). Now, the processing for the throttle opening learning completion range determination ends.

Figure 15:
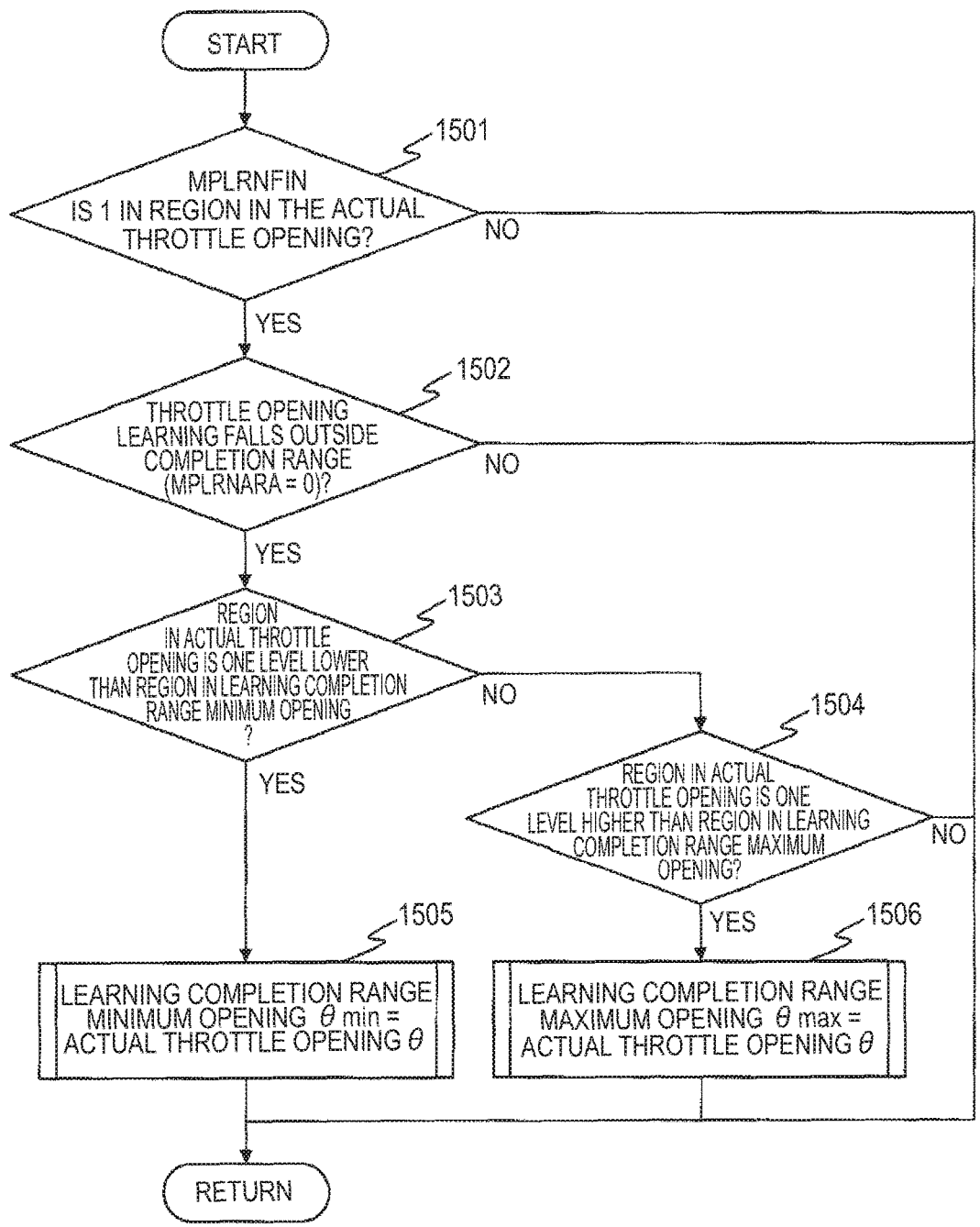
FIG. 15 is a flowchart illustrating throttle opening learning completion range update processing according to embodiment 1 of the invention.

Next, the processing by the throttle opening learning completion range update section 25 performed in the processor 20a of the ECU 20 will be described in detail with reference to the flowchart in FIG. 15 executed in calculation processing (for example, the main processing at intervals of 10 ms or interrupt processing at intervals of BTDC75degCA) at predetermined intervals.

In step 1501, a determination is made as to whether learning of the throttle opening is completed (MPLRNFIN=1) based on calculation by the throttle opening learning completion determination section 23 in the region of the actual throttle opening θ. When the determination result is YES, the processing proceeds to step 1502. When the determination result is NO, the processing ends.

In step 1502, a determination is made as to whether the throttle opening learning completion outside range (MPLRNARA=0) calculated by the throttle opening learning completion range determination section 24 is met in the region of the actual throttle opening θ. When the determination result is YES, the processing proceeds to step 1503. When the determination result is NO, the processing ends.

In step 1503, a determination is made as to whether the region in the actual throttle opening θ is one level lower than the region in the learning completion range minimum opening θmin. When the determination result is YES, the processing proceeds to step 1505. When the determination result is NO, the processing proceeds to step 1504.

In step 1504, a determination is made as to whether the region in the actual throttle opening θ is one level higher than the region in the learning completion range maximum opening θmax. When the determination result is YES, the processing proceeds to step 1506. When the determination result is NO, the processing ends.

Next, in step 1505, when all conditions in step 1501 and step 1502 are met and the condition in step 1503 is met (that is, when it is determined that the region in the actual throttle opening θ meets the throttle opening learning completion (MPLRNFIN=1) and the throttle opening learning completion outside range (MPLRNARA=0) and the region in the actual throttle opening θ in which the throttle opening learning is completed is one level lower than the learning completion range minimum opening θmin), the lower limit of the learning completion range is updated by assuming that the learning completion range minimum opening θmin equals the actual throttle opening θ.

Next, in step 1506, when the all conditions in step 1501 and step 1502 are met and the condition in step 1504 is met (that is, when it is determined that the region in the actual throttle opening θ meets the throttle opening learning completion (MPLRNFIN=1) and the throttle opening learning completion outside range (MPLRNARA=0) and the region in the actual throttle opening θ in which the throttle opening learning is completed is one level higher than the learning completion range maximum opening θmax), the upper limit of the learning completion range is updated by assuming that the learning completion range maximum opening θmax equals the actual throttle opening θ. Now, the processing for throttle opening learning completion range update ends.

By calculating the throttle opening learning completion range as described above, even when throttle control is made across a throttle opening unlearning region, throttle opening control can be made by determining whether the throttle opening learning value is considered. It should be noted that, in the first calculation processing (immediately after a battery or the like is connected), the throttle opening learning completion range is extended as a contiguous region for each region on the increasing side (maximum value) and the reducing side (maximum value) of the throttle opening using, as the starting point, the region in the actual throttle opening θ for which throttle opening learning has been first completed.

The correlation between the effective opening area and the actual throttle opening is made close to a normal state by calculating the effective opening area using the flow rate of intake air as described above,
the throttle opening learning completion range indicating the region for which throttle opening learning has been completed is calculated based on the deviation state of the effective opening area corrected by throttle opening learning and the actual effective throttle opening, by performing throttle opening learning control for absorbing variations caused by type differences of throttle valve 4 at the same time, and control by applying the throttle opening learning value or the fail-safe of the intake air flow rate detection section can be accurately performed in the contiguous throttle opening learning completion range by selecting whether the throttle opening learning value is considered.

Various modifications and alterations of this invention will be apparent to those skilled in the art without departing from the scope and spirit of this invention, and it should be understood that this is not limited to the illustrative embodiments set forth herein.

What is claimed is:

1. A control apparatus for internal combustion engines comprising:
a throttle valve that is provided in an intake passage of an internal combustion engine;
an operating state detection sensor including a throttle opening detection sensor that detects an actual opening of the throttle valve,
an intake air flow rate detection sensor that detects an actual flow rate of intake air supplied to the internal combustion engine,
an intake manifold pressure detection sensor that detects a pressure between the throttle valve and the internal combustion engine as an intake manifold pressure and
an intake air temperature detection sensor that detects a temperature of intake air between the throttle valve and the atmosphere
the operating state detection sensor detecting an operating state of the internal combustion engine; and
a processor that receives output information from the operating state detection sensor,
wherein the processor is configured to:
variably control a flow rate of intake air supplied to the internal combustion engine by changing an effective opening area of the intake passage by controlling an opening of the throttle valve,
calculate an actual effective opening area corresponding to an actual throttle opening detected by the throttle opening detection sensor by applying the actual flow rate of intake air, the intake manifold pressure, and the intake air temperature to a flow rate formula for a throttle type flow meter,
learn a correlation between the effective opening area and the throttle opening based on a correlation map between the effective opening area and the throttle opening prepared in advance, the actual effective opening area, and the actual throttle opening and calculates a throttle opening learning value, the throttle opening learning value corresponding to a learned effective opening area and a learned flow rate of intake air,
determine whether a deviation is equal to or less than a predetermined value, the deviation being obtained based on the correlation map between the effective opening area and the throttle opening learning value, the actual effective opening area, and the actual throttle opening, the deviation being at least one from among: a deviation between the throttle opening learning value and the actual throttle opening, a deviation between the learned effective opening area and the actual effective opening area, and a deviation between the learned flow rate of intake air and the actual flow rate of intake air, wherein the processor is configured to determine that learning has been completed for the actual throttle opening in response to determining that the deviation is equal to or less than the predetermined value;
determine whether the actual throttle opening falls within the range of a contiguous throttle opening region for which the processor has already determined that learning has been completed; and
update a throttle opening learning completion range when the processor has determined the completion of learning for the actual throttle opening and the processer has determined that the actual throttle opening falls outside the range, and wherein, in response to the throttle opening learning value being present in the throttle opening learning completion range updated by the processer, the processer is further configured to use the throttle opening learning value to calculate a target throttle opening and control the throttle valve.

2. The control apparatus for internal combustion engines according to claim 1, wherein the deviation determined by the processor is the deviation between the throttle opening learning value and the actual throttle opening.

3. The control apparatus for internal combustion engines according to claim 1, wherein the deviation determined by the processor is the deviation between the learned effective open area and the actual effective opening area.

4. The control apparatus for internal combustion engines according to claim 1, wherein the deviation determined by the processor is a plurality of deviations including the deviation between the throttle opening learning value and the actual throttle opening, the deviation between the learned effective opening area and the actual effective opening area, and the deviation between the learned flow rate of intake air and the actual flow rate of intake air.

5. The control apparatus for internal combustion engines according to claim 1, wherein the throttle opening learning completion range is a range between a learning completion range maximum value that is the maximum value in the contiguous throttle opening region for which completion of learning of the throttle opening has been determined and a learning completion range minimum value that is the minimum value in the contiguous throttle opening region.

6. The control apparatus for internal combustion engines according to claim 1, wherein, when learning has been determined to be completed for the actual throttle opening and when the actual throttle opening falls outside the throttle opening learning completion range, if the actual throttle opening is larger than the maximum value in the throttle opening learning completion range, the processor increases the maximum value in the throttle opening learning completion range and, if the actual throttle opening is smaller than the minimum value of the throttle opening learning completion range, the processor reduces the minimum value in the throttle opening learning completion range.

7. The control apparatus for internal combustion engines according to claim 1, wherein, when the actual throttle opening falls within the throttle opening learning completion range, completion of learning is determined, when the actual throttle opening falls outside the throttle opening learning completion range, incompletion of learning is determined, and whether to use the throttle opening learning value to calculate a target throttle opening and control the throttle valve is determined depending on determination of completion of learning.

8. The control apparatus for internal combustion engines according to claim 1, wherein, when the actual throttle opening falls within the throttle opening learning completion range, fail-safe of the intake air flow rate detection sensor is performed in consideration of the throttle opening learning value.

* * * * *